(12) United States Patent  
Alkouby

(10) Patent No.: US 9,232,127 B2  
(45) Date of Patent: Jan. 5, 2016

(54) LOUPE ACCESSORY AND VIEWING METHOD

(71) Applicant: Moshe Lior Alkouby, London (GB)

(72) Inventor: Moshe Lior Alkouby, London (GB)

( * ) Notice: Subject to any disclaimer, the term of this patent is extended or adjusted under 35 U.S.C. 154(b) by 339 days.

(21) Appl. No.: 13/872,142

(22) Filed: Apr. 28, 2013

(65) Prior Publication Data

US 2014/0320625 A1     Oct. 30, 2014

(51) Int. Cl.
| | |
|---|---|
| *G01N 21/00* | (2006.01) |
| *H04N 5/232* | (2006.01) |
| *G02B 25/00* | (2006.01) |
| *H04N 5/225* | (2006.01) |

(52) U.S. Cl.  
CPC .............. *H04N 5/232* (2013.01); *G02B 25/007* (2013.01); *H04N 5/2254* (2013.01)

(58) Field of Classification Search  
CPC ....... G01N 21/64; G01N 21/65; G01N 21/87; G01N 21/8806; G01N 33/381  
USPC ................................ 356/30, 72–73, 300–445  
See application file for complete search history.

(56) References Cited

U.S. PATENT DOCUMENTS 5,734,500 A * 3/1998 Gebelein ....................... 359/419

* cited by examiner

*Primary Examiner* — Abdullahi Nur  
(74) *Attorney, Agent, or Firm* — Graeser Associates International Inc; Dvorah Graeser

(57) ABSTRACT

A loupe accessory comprising: a loupe, comprising a first lens characterized in a positive focal length of less than 350 mm, the first lens for producing substantially infinity rays from a relatively close object, and an infinity-focus camera, comprising an image sensor and a second lens disposed at a fixed distance from the image sensor, the fixed distance being a focal length of the second lens, wherein the infinity-focus camera is fixed to the first lens, for imaging the infinity rays on the image sensor, thereby a first portion of the infinity rays produced by the first lens is imaged by the infinity-focus camera, and a second portion of the infinity rays produced by a second portion of the first lens is directly viewed by a human eye.

6 Claims, 5 Drawing Sheets

LOUPE ACCESSORY AND VIEWING METHOD

FIELD OF THE INVENTION

The present invention relates to the field of loupes. More particularly, the invention relates to a method and apparatus for combining direct and digital viewing.

BACKGROUND OF THE INVENTION

A loupe or a magnifying lens is a device frequently associated with jewelers, usually taking the form of a simple positive lens. In use, the magnifier is held close to the eye, while the object to be viewed is brought to the focal point of the lens.

A loupe constitutes any positive lens with a focal length of less than 250 mm applied for direct viewing of a close object by the human eye. The approximate magnification M provided by the lens is calculated by dividing its focal length into 250. For example, a 50-mm lens will provide a magnification of M=250/50=5×; a 25-mm lens will provide a magnification of M=250/25=10×.

This formula applies to the typical case where the object is placed at the focal plane of the magnifier lens and the virtual image being viewed appears at infinity. This condition allows comfortable viewing with the relaxed eye.

Especially in jewelry, the basic assumption is that the user believes the direct view by the eye through the loupe, even though digital imaging may provide even greater magnification. The reason is that the user observes the diamond from different angles and with different illuminations thereon.

However, this assumption limits the marketing of jewelry, especially regarding diamonds, in that one expert may travel all over the world to physically show other people the diamond, offering it for sale.

All the methods described above have not yet provided satisfactory solutions to the problem of direct-eye viewing requirement together with information sharing between persons.

It is an object of the present invention to provide a method and apparatus for satisfying the direct-eye viewing requirement, together with information sharing between persons.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a loupe accessory (10) comprising:

a loupe, comprising a first lens (22) characterized in a positive focal length of less than 350 mm, the first lens (22) for producing substantially infinity rays (48A) from a relatively close object (24); and an infinity-focus camera (26), comprising an image sensor (54) and a second lens (52) disposed at a fixed distance from the image sensor (54), the fixed distance being a focal length (56) of the second lens (52), wherein the infinity-focus camera (26) is fixed to the first lens (22) at the side of the eye, occupying a relatively small portion of the first lens (22), for imaging the infinity rays (48A) on the image sensor (54), thereby a first portion of the infinity rays (48A) produced by the first lens (22) is imaged by the infinity-focus camera (26), and a second portion of the infinity rays (48A) produced by a second portion of the first lens (22) is directly viewed by a human eye (38), thereby the infinity-focus camera (26) captures the direct view of the human eye (38).

The loupe accessory (10) may further comprise:

a button (14) for manually operating the infinity-focus camera (26), for photographing the object (24) upon the direct viewing by the human eye (38).

The loupe accessory (10) may further comprise:

at least one port (16), for transferring the photographing from the infinity-focus camera (26), thereby substantially allowing showing the direct view of the human eye (38) to another person.

The loupe may further comprise:

a handle (12) comprising a packaging case for the first lens (22); and a pivotal connection of a frame (20) of the lens (22) to the handle (12), thereby the loupe accessory (10) is shaped like a prior art loupe.

The infinity-focus camera (26) may produce still pictures and/or video.

In another aspect, the present invention is directed to a loupe viewing method, the method comprising the steps of:

producing substantially infinity rays (48A) from an object (24) by a lens (22) of a loupe, the infinity rays (48A) for allowing direct viewing thereof by a human eye (38); and imaging the infinity rays (48A) on an image sensor (54) of an infinity-focus camera (26), thereby the infinity-focus camera (26) captures the direct view of the human eye (38).

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments, features, aspects and advantages of the present invention are described herein in conjunction with the following drawings.

It should be understood that the drawings are not necessarily drawn to scale.

DETAILED DESCRIPTION OF THE INVENTION

The present invention will be understood from the following detailed description of embodiments of the invention, which are meant to be descriptive and not limiting. For the sake of brevity, some well-known features, methods, systems, procedures, components, circuits, and so on, are not described in detail.

Figure 1:
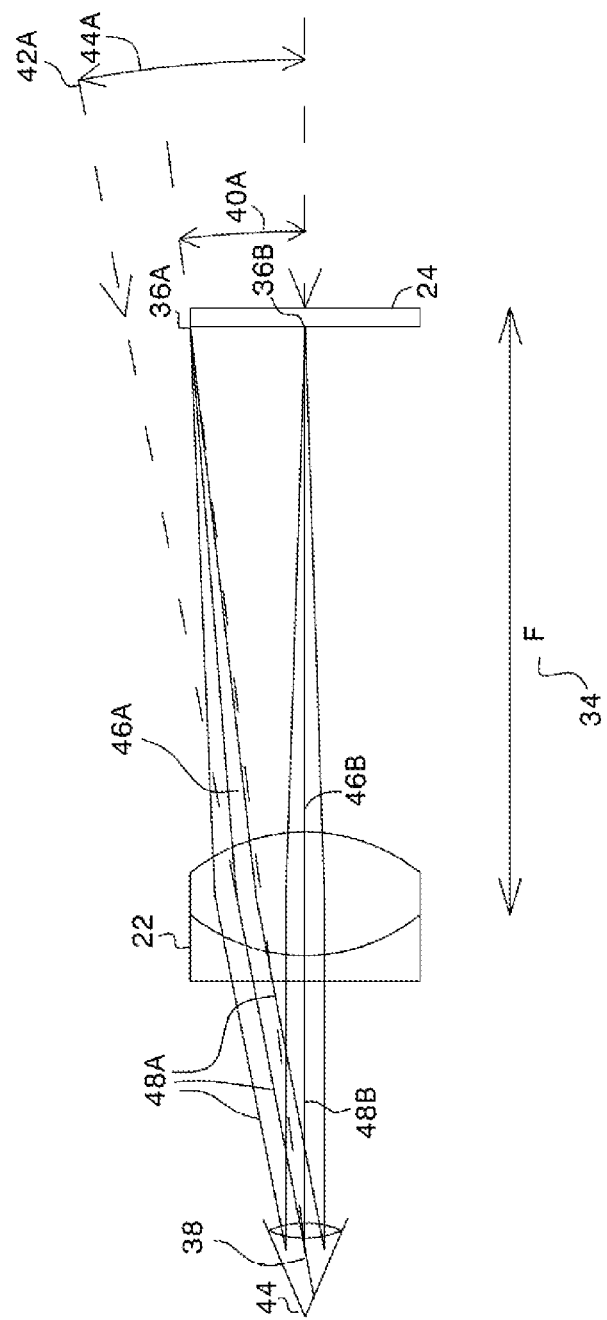
FIG. 1 depicts typical rays of a prior art loupe.

FIG. 1 depicts typical rays of a prior art loupe.

A prior art loupe 22 constitutes a convex lens. The typical distance of the viewed object 24 from loupe 22 is the focal length 34 of loupe 22. Thus, loupe 22 directs all the rays 46A emanating from point 36A of object 24 to be parallel one to the other, being rays 48A; and loupe 22 directs all the rays 46B emanating from point 36B of object 24 to be parallel one to the other, being rays 48B.

Parallel rays 48A and 48B emanating towards eye 38 provide relaxed focusing of the eye to the retina 44.

Thus, eye 38 imagines that rays 46A emanating from point 36A coming from an angle 40A, emanate from an infinite object 42A having an angle 44A.

The term "infinity rays" refers herein to parallel rays 48A and 48B, since they resemble rays emanating from a very distant object.

Thus, the magnification that lens 22 provides is angle 44A divided by angle 40A.

Figure 2:
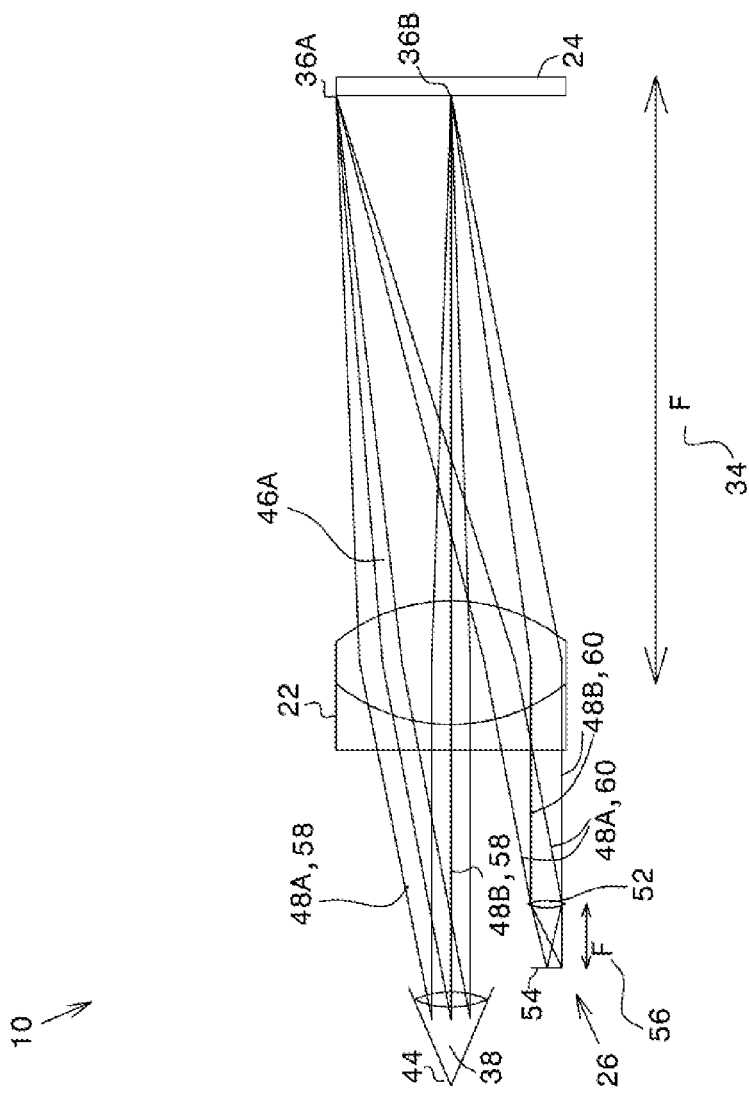
FIG. 2 depicts a loupe accessory, according to one embodiment of the present invention.

FIG. 2 depicts a loupe accessory, according to one embodiment of the present invention.

In optics and photography, infinity focus is the state wherein a lens forms an image of an object disposed at an infinite distance away from the lens. The infinity is an approximation that even though an object is not in fact disposed at infinity, since the rays emanating therefrom are approximately parallel, only the angle from each point of the object influences the image.

The image for infinity focus is formed at the focal point of the lens, and does not require focusing. The infinity focus approximation is applied in known cameras, having a non-adjustable lens and a fixed distance from the lens to the image sensor. The fixed distance is fixed to the focal length of the camera.

The term "infinity-focus camera" refers herein to a camera having a fixed distance from the lens to the image sensor thereof, the distance being approximately the focal length of the lens.

A loupe accessory 10 includes an infinity-focus camera 26, and loupe 22, for producing infinite (parallel) rays 48A and 48B to the eye 38 and also to infinity-focus camera 26. A first portion 58 of infinite rays 48A and 48B emanate towards eye 38, and a second portion 60 of infinite rays 48A and 48B emanate towards infinity-focus camera 26, and are imaged thereby.

Infinity-focus camera 26 includes a lens 52 disposed at a fixed distance from the image sensor thereof 54, the distance being the focal length 56 of lens 52.

Thus, infinity-focus camera 26 occupies a portion of the area of loupe 22, and thus the area of infinity-focus camera 26 must be relatively small in relation to the area of loupe 22, for allowing eye 38 to comfortably view object 24.

Camera 26 need not include a display, since the loupe accessory is intended for photographing human aspects viewed by eye 38 directly through loupe 22. Thus, camera 26 must be designed and fixed such that the photograph provides a picture or video identical to the view of eye 38 directly through loupe 22.

Since loupe 22 produces parallel rays 48A and 48B in fact, not in approximation, infinity-focus camera 26 requiring parallel rays, is suited for imaging the rays, without further adjustment based on viewing a display.

Figure 3:
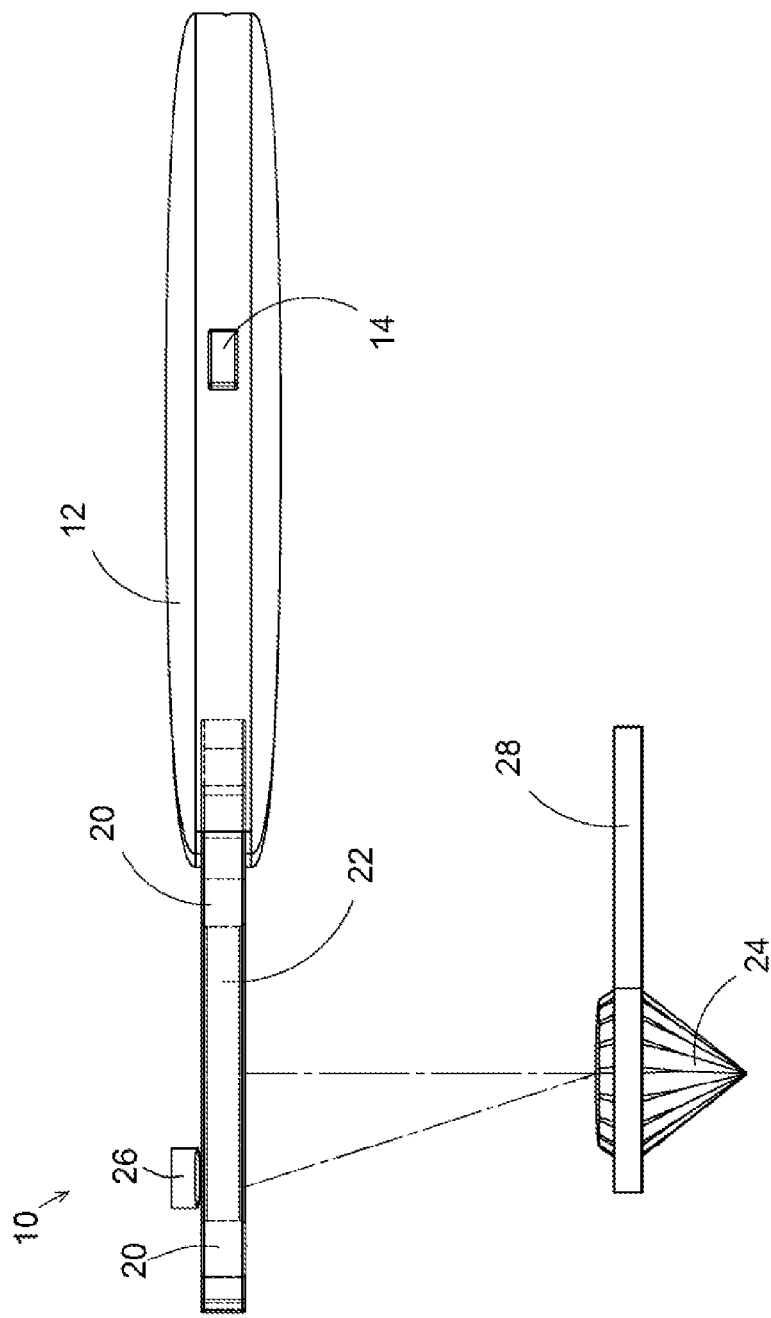
FIG. 3 is a side view of the loupe accessory of FIG. 2.

FIG. 3 is a side view of the loupe accessory of FIG. 2.

Figure 4:
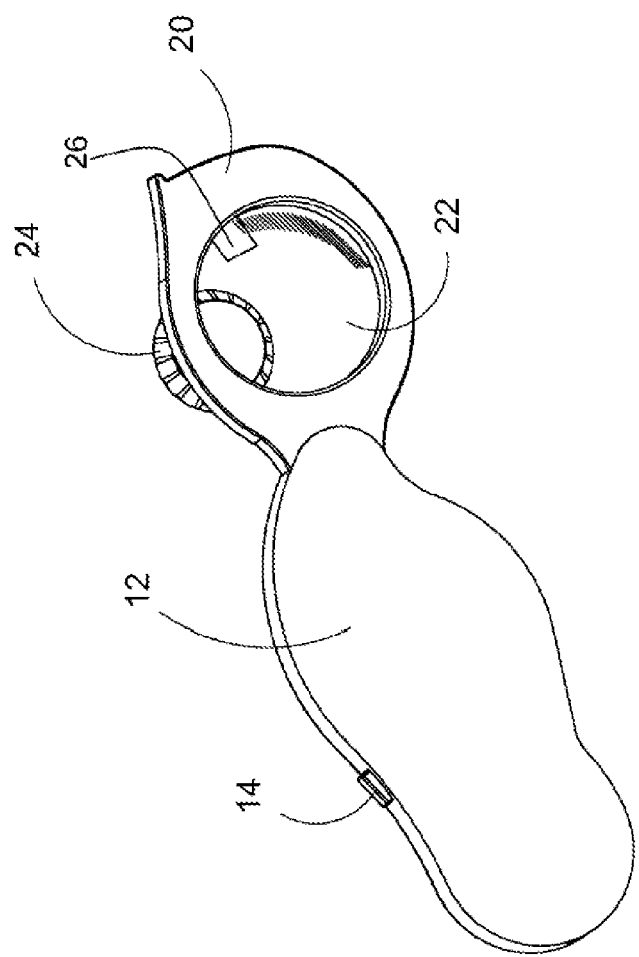
FIG. 4 is a top perspective view of the loupe accessory of FIG. 2.

FIG. 4 is a top perspective view of the loupe accessory of FIG. 2.

A diamond 24 held by tweezers 28 is viewed through lens 22, both by the eye (not shown) and by camera 26 occupying a portion of lens 22.

Loupe accessory 10 includes lens 22 surrounded by a frame 20, pivotally connected to a handle 12. Handle 12 includes a button 14 for operating the photographing. For example, a short press captures a still picture, and a long press on button 14 captures a video.

Figure 5:
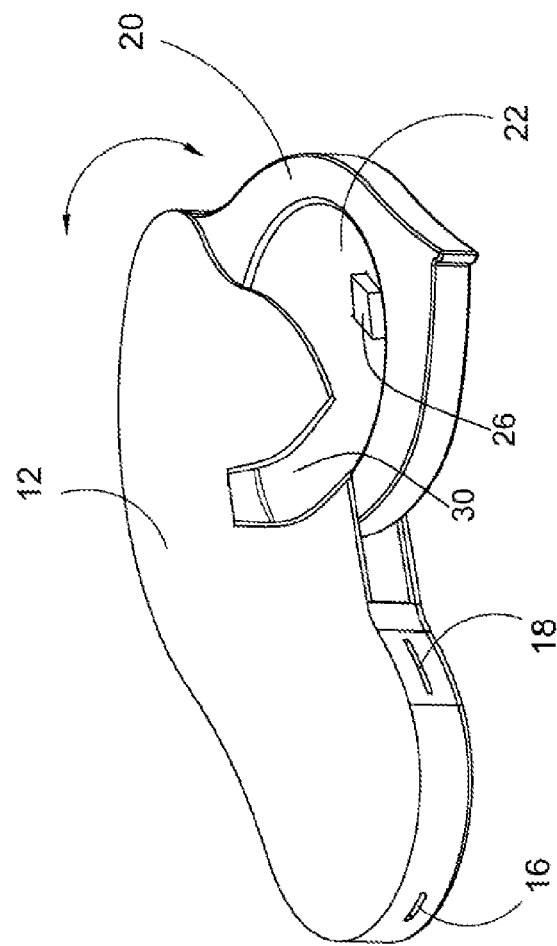
FIG. 5 is a perspective view of the loupe accessory of FIG. 2 being folded.

FIG. 5 is a perspective view of the loupe accessory of FIG. 2 being folded.

Camera 26 is intended for storing the direct view of the eye. Thus, camera 26 includes a memory (not shown), and means for transferring the information thereof. The means may include a port 16, such as a USB (universal serial bus) port, and a slit 18 for inserting a memory card.

Loupe accessory 10 is shaped like a prior art loupe and may be folded similarly. For example, a depression 30 within handle 12 encasing lens 22, may allow sliding camera 26 therewithin, for folding lens 22 within handle 12.

In the figures and/or description herein, the following reference numerals (Reference Signs List) have been mentioned:

numeral 10 denotes a loupe accessory according to one embodiment of the present invention;

numeral 12 denotes a handle, for holding and encasing the lens of the loupe;

numeral 14 denotes a button for capturing;

numeral 16 denotes a port such as a USB;

numeral 18 denotes a slit for a memory card;

numeral 20 denotes the frame of the lens;

numeral 22 denotes the lens, being the main component of the loupe;

numeral 24 denotes the object to be viewed, such as a diamond;

numeral 26 denotes a camera; the camera being of an infinity focus type;

numeral 28 denote tweezers;

numeral 30 denotes a depression, for allowing folding the lens within the handle;

numeral 34 denotes the focal length of the lens of the loupe;

numerals 36A and 36B denote points of the object to be viewed;

numeral 40A denotes the angle from the point of the object to the eye;

numeral 42A denotes an imaginary infinite object;

numeral 44A denotes the angle of the imaginary infinite object;

numerals 46A and 46B each denote a plurality of rays emanating from points of the objects;

numerals 48A and 48B each denote a plurality of parallel rays produced by the lens of the loupe;

numeral 52 denotes a lens of the camera;

numeral 54 denotes an image sensor, such as a CCD array, of the camera;

numeral 56 denotes the focal length of the lens of the camera;

numeral 58 denotes the portion of parallel rays produced by the lens of the loupe and emanating towards the eye; and numeral 60 denotes the portion of parallel rays produced by the lens of the loupe and emanating towards the camera.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A loupe accessory comprising:
   a loupe, comprising a first lens characterized in a positive focal length of less than 350 mm, said first lens for producing substantially infinity rays from a relatively close object; and
   an infinity-focus camera, comprising an image sensor and a second lens disposed at a fixed distance from said image sensor, said fixed distance being a focal length of said second lens,
   wherein said infinity-focus camera is fixed to said first lens at the side of the eye, occupying a relatively small portion of said first lens, for imaging said infinity rays on said image sensor,
   thereby a first portion of said infinity rays produced by said first lens is imaged by said infinity-focus camera, and
   a second portion of said infinity rays produced by a second portion of said first lens is directly viewed by a human eye,
   thereby said infinity-focus camera captures the direct view of the human eye.

2. A loupe accessory according to claim 1, further comprising:
   a button for manually operating said infinity-focus camera, for photographing said object upon the direct viewing by the human eye.

3. A loupe accessory according to claim 1, further comprising:
   at least one port, for transferring said photographing from said infinity-focus camera,
   thereby substantially allowing showing the direct view of the human eye to another person.

4. A loupe accessory according to claim 1, wherein said loupe further comprises:
   a handle comprising a packaging case for said first lens; and
   a pivotal connection of a frame of said lens to said handle, thereby said loupe accessory is shaped like a prior art loupe.

5. A loupe accessory according to claim 1, wherein said infinity-focus camera produces a member selected from a group including: still pictures, video.

6. A loupe viewing method, said method comprising the steps of:
   producing substantially infinity rays from an object by a lens of a loupe, said infinity rays for allowing direct viewing thereof by a human eye; and
   imaging said infinity rays on an image sensor of an infinity-focus camera, thereby said infinity-focus camera captures the direct view of the human eye.

* * * * *